Patented June 1, 1937

2,082,354

UNITED STATES PATENT OFFICE 2,082,354

METHOD FOR MAKING SINTERED SHAPED BODIES

Reinhold Reichmann, Berlin, Germany, assignor, by mesne assignments, to The American Cutting Alloys, Inc., New York, N. Y., a corporation of Delaware No Drawing. Application September 4, 1934, Serial No. 742,633. In Germany September 6, 1933

7 Claims. (Cl. 75—137)

My invention relates to a method for making sintered shaped bodies, and more particularly hollow bodies of highly refractory metals or of hard alloys containing as essential constituents a metallic carbide, boride, nitride, etc.

It is well known in the art to manufacture such shaped bodies of pulverized mixtures of the above-indicated metals or alloys by pressing the pulverized mixture to form the shaped bodies and solidifying them by subjecting them to a heat treatment. This method of manufacture presents difficulties in the case of shaped bodies which must have exact dimensions or complicated forms. As a rule, it is necessary before finally sintering the shaped bodies to remove a certain amount of material from the pressings by means of cutting tools. Some shapes, particularly complicated hollow shapes, cannot be manufactured at all by pressing.

My invention has for its object to provide a method for manufacturing bodies of highly refractory metals or alloys which method consists in adding to the pulverized mixture used for the manufacture of the above-indicated bodies an electrolyte in such a proportion as to obtain a relatively liquid moldable mass, in casting the mass into absorbing molds, applying heat thereto to remove the moisture from the hollow body formed in the mold and in sintering the same.

The above-mentioned method of manufacture is similar to that employed in making porcelain or other ceramic bodies; however, the product obtained thereby is not a ceramic product, but a body consisting of a metal.

In the manufacture of metallic bodies according to the invention the pulverized mixture employed as starting material may be mixed, for instance, with water to which for example alkaline or acid salts are added.

In this case such salts may be employed which are reduced during the sintering process to a metal which is already present in the alloy or which does not impair the desired properties of the metallic body. A small amount of a binding agent may also be added to the mixture if desired.

The casting may be effected according to the same working methods which are usually employed in the manufacture of ceramic articles. The molds are also preferably made of plaster and may consist of one piece or in the case of complicated bodies a divided plaster mold may be employed. Furthermore, cores may be also used so as to make predetermined shaped bores, such as threaded bores. During the settling of the mass in the mold the plaster body absorbs the liquid contained in the mass. In this case an adhesion of the mass to the plaster mold is prevented by the use of an electrolyte.

The mass thus obtained may be, as a rule, highly sintered without requiring any further working. The dimensions of the body are extremely exact. Furthermore, shapes may be obtained which were impossible with the methods of pressing hitherto employed.

The nature of the product employed for the manufacture of the above-described shaped bodies depends upon the desired finished product. The method may be employed for the manufacture of bodies which are to consist substantially of pure metal. However, a particular advantage may be obtained in such metallic bodies which contain as essential constitutents one or more highly refractory carbides, nitrides or borides or other hard alloys of metallic nature. For instance, by the method according to the invention it is possible to manufacture bodies which contain as essential constituents tungsten carbide, molybdenum carbide, titanium carbide, tantalum carbide or mixtures or double compounds thereof and besides a small amount of a metallic constituent in elementary form.

The metallic constituent may in this case consist of one or more metals of the Fe-group or of a highly refractory metal, for instance metallic tungsten, tantalum or chromium. In all these cases metallic bodies are involved which are extremely hard and also relatively highly brittle. It was for this reason heretofore practically impossible to manufacture articles having complicated shapes of such hard metals, since only the pressing method was available in the past for the manufacture of the above-described shaped bodies.

One specific embodiment of the invention may be mentioned in detail:—About 80% tungsten carbide, 10% titanium carbide and 10% metallic cobalt may be mixed together in pulverulent form. About 900 grams of this mixture may be added to a solution containing about 100 cm³ water, 5 grams cobalt nitride and an addition of 2-3 cm³ glycerine. The resulting mixture is stirred to form a moldable mass which may be cast or poured into the previously noted absorbing molds so as to form the desired bodies. The desired wall thickness, in case of a hollow body, may be obtained according to well known procedures applied in making ceramic bodies. The same holds true for producing bodies without a core. After the bodies are dried and solidified, they are removed from the molds and sintered as noted before.

A considerable advantage over the previously known methods—not only in the case of hard alloys containing great quantities of carbide, but also in the case of articles made of metals in elementary form—lies in the possibility of being able to obtain the desired dimensions and shapes in a very exact manner, whereas heretofore it has been, as a rule, necessary to remove from the pressing a portion of the material by means of cutting tools so as to obtain the final shape. The working of the brittle pressing is difficult or it requires a presintering at a low temperature. By the method according to the invention a subsequent working of the pressing is reduced to a minimum or may be entirely dispensed with.

I claim as my invention:

1. The method of manufacturing dense and mechanical wear resisting shaped bodies consisting of hard and highly wear resisting compound or compounds, other than oxides, melting above about 2000° C. as essential constituent and up to about 20% cementing metal melting above about 1300° C., as remainder comprising the successive steps of mixing said compound or compounds and said metal in finely divided form with a liquid so as to form a liquid suspension, casting said suspension into a mould of desired shape capable of absorbing said admixed liquid, permitting said mould to absorb said admixed liquid from adjacent layers of said suspension to a desired depth, thereby rendering said layers coherent and of desired shape, and subjecting said coherent layers to heat treatment up to high sintering temperature, thereby driving off any remains of said admixed liquid and ultimately forming a dense body.

2. The method of manufacturing dense and shaped bodies of sintered hard alloys containing one or more hard compounds other than oxides of highly refractory metals as essential constituents, up to 20% cementing metal substantially of the iron group, and a small amount of highly refractory metal as remainder, comprising the steps of mixing said compounds and metals in finely divided form with a liquid so as to form a slip, casting said slip into a mould of desired shape capable of absorbing said liquid, permitting said mould to absorb liquid from adjacent layers of said slip to a desired depth, thereby rendering said layers coherent so as to form the desired shaped body, and drying and sintering the shaped body thus obtained.

3. The method of manufacturing sintered dense and mechanical wear-resisting shaped bodies containing highly refractory carbide as essential constituent and up to 20% cementing metal substantially of the iron group as remainder, comprising the steps of mixing said carbide and said metal in finely divided form with water containing an electrolytic substance so as to form a slip, casting said slip into a mould capable of absorbing water, permitting said mould to absorb water from adjacent layers of said slip to a desired depth, thereby rendering said layers coherent so as to form the desired shaped body, and subjecting said body to heat treatment up to sintering temperature.

4. The method of manufacturing dense bodies of sintered hard alloys containing boride of highly refractory metal as essential constituent and up to about 20% of cementing metal in elementary form as remainder, comprising the steps of mixing said boride and metal in finely divided form with a liquid so as to form a slip, casting said slip into a mould of desired shape capable of absorbing said liquid, permitting said mould to absorb liquid from adjacent layers of said slip to a desired depth, thereby rendering said layers coherent so as to form the desired shaped body, and drying and sintering the shaped body thus obtained.

5. The method of manufacturing shaped bodies of sintered hard alloys containing compounds or mixtures of carbide and boride of highly refractory metal as essential constituent and cementing metal in elementary form up to about 20% as remainder, comprising the steps of mixing said essential constituent and said elementary metal in finely divided form with a liquid so as to form a slip, casting said slip into a mould of desired shape capable of absorbing said liquid, permitting said mould to absorb liquid from adjacent layers of said slip to a desired depth, thereby rendering said layers coherent so as to form the desired shaped body, and drying and sintering the shaped body thus obtained.

6. The method of manufacturing shaped bodies of sintered hard alloys containing compounds or mixtures of carbide and nitride of highly refractory metal as essential constituent and up to about 20% of cementing metal in elementary form as remainder, comprising the steps of mixing said essential constituent and said elementary metal in finely divided form with a liquid so as to form a slip, casting said slip into a mould of desired shape capable of absorbing said liquid, permitting said mould to absorb liquid from adjacent layers of said slip to a desired depth, thereby rendering said layers coherent so as to form the desired shaped body, and drying and sintering the shaped body thus obtained.

7. The method of manufacturing dense and mechanical wear-resistant bodies of sintered hard alloys containing carbide of one or more of the metals tungsten, molybdenum, tantalum, titanium as essential constituent and up to about 20% cementing metal substantially of the iron group as remainder, comprising the steps of mixing said carbide and said metal in finely divided form with a watery electrolyte so as to form a slip, casting said slip into a mould of absorbent material, such as plaster, permitting said mould to absorb water from adjacent layers of said slip to a desired depth, thereby rendering said layers coherent so as to form the desired shaped body, subjecting said body to heat treatment for removing remainders of water and sintering said body.

REINHOLD REICHMANN.